United States Patent [19]

Haruna et al.

[11] Patent Number: 4,684,377
[45] Date of Patent: Aug. 4, 1987

[54] PROCESS FOR PRODUCING OXYGEN-ENRICHED GAS

[75] Inventors: Kazuo Haruna, Kakogawa; Kanji Ueda, Ashiya; Masaru Uno, Akashi, all of Japan

[73] Assignee: Seitetsu Kagaku Co., Ltd., Hyogo, Japan

[21] Appl. No.: 870,052

[22] Filed: Jun. 3, 1986

[51] Int. Cl.⁴ .............................................. B01D 53/04
[52] U.S. Cl. .......................................... 55/26; 55/58; 55/62; 55/68; 55/75
[58] Field of Search ................... 55/25, 26, 58, 62, 68, 55/75

[56] References Cited

U.S. PATENT DOCUMENTS

| | | | |
|---|---|---|---|
| 3,164,454 | 1/1965 | Wilson | 55/58 X |
| 3,313,091 | 4/1967 | Berlin | 55/58 |
| 3,430,418 | 3/1969 | Wagner | 55/25 |
| 3,564,816 | 2/1971 | Batta | 55/26 |
| 3,636,679 | 1/1972 | Batta | 55/26 |
| 3,717,974 | 2/1973 | Batta | 55/58 |
| 3,738,087 | 6/1973 | McCombs | 55/58 |
| 3,923,477 | 12/1975 | Armond et al. | 55/25 |
| 4,065,272 | 12/1977 | Armond | 55/25 |
| 4,144,037 | 3/1979 | Armond et al. | 55/58 |
| 4,168,149 | 9/1979 | Armond et al. | 55/25 X |
| 4,222,750 | 9/1980 | Gauthier et al. | 55/58 |
| 4,331,455 | 5/1982 | Sato | 55/62 X |
| 4,340,398 | 7/1982 | Doshi et al. | 55/58 X |
| 4,449,990 | 5/1984 | Tedford, Jr. | 55/26 |
| 4,519,813 | 5/1985 | Hagiwara et al. | 55/26 |
| 4,548,799 | 10/1985 | Knoblauch et al. | 55/26 X |
| 4,599,094 | 7/1986 | Werner et al. | 55/58 X |
| 4,614,525 | 9/1986 | Reiss | 55/58 X |

FOREIGN PATENT DOCUMENTS

| | | | |
|---|---|---|---|
| 43179 | 4/1979 | Japan | 55/26 |
| 152518 | 11/1980 | Japan | 55/26 |

Primary Examiner—Robert Spitzer
Attorney, Agent, or Firm—Pollock, Vande Sande & Priddy

[57] ABSTRACT

An oxygen-enriched gas having an oxygen concentration of, for example, 93% by volume, is produced at a high oxygen recovery rate from a gas mixture containing oxygen and nitrogen as main gas components by pressure swing adsorption, using a set of three adsorption columns, each packed with a zeolite molecular sieve as an adsorbent through a cyclic operation of adsorption under a pressure of from atmospheric pressure to 5,000 mm H₂O and desorption under vacuum pressure down to the final pressure of 150 mm Hg abs.

4 Claims, 2 Drawing Figures

| STEP / VALVE NO. | ONE CYCLE | | | | | |
|---|---|---|---|---|---|---|
| | 1st STEP | | 2nd STEP | | 3rd STEP | |
| | 3~10 sec | 50~70 sec | 3~10 sec | 50~70 sec | 3~10 sec | 50~70 sec |
| 1 | ■ | ■ | | | | |
| 2 | | | ■ | ■ | | |
| 3 | | | | | ■ | ■ |
| 4 | | | ■ | ■ | | |
| 5 | | | | | ■ | ■ |
| 6 | ■ | ■ | | | | |
| 7 | ■ | ■ | | | | |
| 8 | | | ■ | ■ | | |
| 9 | | | | | ■ | ■ |
| 10 | | | | | ■ | ■ |
| 11 | ■ | ■ | | | | |
| 12 | | | ■ | ■ | | |
| 13 | | | ■ | | | |
| 14 | | | | | ■ | |
| 15 | ■ | | | | | |
| 16 | | ■ | | ■ | | ■ |
| 1st ADSORPTION COLUMN | ADSORPTION | | RECOVERY | DESORPTION | RECOVERY | FILLING |
| 2nd ADSORPTION COLUMN | RECOVERY | FILLING | ADSORPTION | | RECOVERY | DESORPTION |
| 3rd ADSORPTION COLUMN | RECOVERY | DESORPTION | RECOVERY | FILLING | ADSORPTION | |

: OPEN

PROCESS FOR PRODUCING OXYGEN-ENRICHED GAS

BACKGROUND OF THE INVENTION

This invention relates to a process for producing an enriched oxygen gas from a mixed gas containing oxygen and nitrogen as main gas components, particularly air, by pressure swing adsorption.

An oxygen-enriched gas obtained by pressure swing adsorption can be supplied easily and continuously on site and at low cost to industries requiring continuous supply of a large amount of an oxygen gas, particularly steel manufacture using an electric furnace, oxygen aeration for water treatment, pulp bleaching, etc. Thus, the oxygen-enriched gas is more and more widely utilized.

In the conventional process for producing an oxygen-enriched gas by pressure swing adsorption, a pressure equalization step is provided as a means of enhancing the oxygen recovery rate, wherein a lower pressure column which has completed desorption and a higher pressure column which has completed adsorption are connected to each other and to transfer the gas remaining in the higher pressure column therefrom to the lower pressure column until the pressures in the two columns are equalized, whereby a gas having a higher oxygen concentration than that of the feed gas is recovered (U.S. Pat. Nos. 3,738,087 and 3,923,477). However, since the gas recovery is conducted until the pressures of the two columns become completely equal to each other, the transferred gas inevitably contains a large amount of nitrogen gas. Although the oxygen recovery rate is improved, the oxygen concentration of the product oxygen-enriched gas is lowered. Thus, it has been so far desired to overcome the reduction of oxygen concentration of the product oxygen-enriched gas by pressure equalization.

SUMMARY OF THE INVENTION

An object of the present invention is to provide a process for producing an oxygen-enriched gas in a high yield from a gas mixture containing oxygen and nitrogen as main components, particularly air, by pressure swing adsorption.

Other objects of the present invention will become apparent from the description of the invention which follows.

The present inventors have made extensive studies to overcome the problem inherent to the conventional process and have found that an oxygen-enriched gas can be obtained at a high oxygen recovery rate by transfering the oxygen-enriched gas remaining in a column which has completed adsorption under a substantially atmospheric pressure therefrom to another column which has completed desorption under a vacuum pressure in as short a time as possible to recover the remaining oxygen-enriched gas. The present inventors have further found that the gas transfer time for the remaining gas recovery should be so shortened and also the gas recovery volume should be so limited as to keep the nitrogen gas content in the recovered gas as low as possible. When influences of gas flow on a packed bed, such as fluidization of packed bed, are taken into consideration, the gas recovery time should be as short as about 5 seconds. The recovery gas volume is limited because it is necessary to prevent the nitrogen gas desorbed from the zeolite molecular sieve in the column which has completed adsorption from transfer from the outlet of that column to the other column, which has completed desorption.

The present invention provides a process for producing an oxygen-enriched gas from a gas mixture containing oxygen and nitrogen as main gas components by pressure swing adsorption. A set of three adsorption columns, each packed with a zeolite molecular sieve as an adsorbent through cyclic operation of adsorption under a pressure of from atmospheric pressure to 5000 mm $H_2O$ and desorption under vacuum pressure down to the final pressure of 150 mm Hg abs. are used. The present invention comprises passing the gas mixture through a first adsorption column, thereby conducting adsorption of substantially other gas components except the oxygen gas, while bringing a third adsorption column which has completed adsorption into vacuum pressure through the inlet thereof, thereby conducting desorption of the adsorbed gas components in the third adsorption column and withdrawing the resulting desorbed gas components through the inlet thereof in the direction opposite to the inflow direction of the gas mixture for adsorption. Connecting the outlet of the third adsorption column to the outlet of a second adsorption column which has completed desorption at the same time as the initial stage of the desorption of the third adsorption column, thereby transferring the oxygen-enriched gas remaining in the third adsorption column therefrom to the second adsorption column, thereby recovering the remaining oxygen-enriched gas from the third adsorption column. Discontinuing the remaining gas transfer before the pressure of the third adsorption column becomes equal to that of the second adsorption column, while continuing the desorption of the third adsorption column through the inlet thereof. Initiating the filling of part of the product oxygen-enriched gas into the second adsorption column through the outlet thereof just after the discontinuation of the remaining gas transfer; and repeating the foregoing cyclic operations one adsorption column to another successively.

The present invention will be explained in more detail below. A zeolite molecular sieve of 5 Å in average micro-pore size having strong adsorbability for nitrogen is packed in each of three adsorption columns. A gas mixture containing oxygen and nitrogen as main gas components is passed through a first adsorption column under a pressure slightly higher than atmospheric pressure, for example, from atmospheric pressure to 5,000 mm $H_2O$ and a product oxygen-enriched gas is obtained from the outlet of the first adsorption column. After the adsorption has been completed, the oxygen-enriched gas remaining in the first adsorption column is recovered at the initial stage of the desorption step by connecting the outlet of the first adsorption column to the outlet of a second adsorption column which has completed desorption, that is, regeneration, and whose pressure is vacuum, because the desorption is conducted under a vacuum pressure down to the final pressure of 150 mm Hg abs. The oxygen-enriched gas remaining in the upper part of the first adsorption column is transferred into the second adsorption column under vacuum pressure for recovery. In this case, it is essential that the first adsorption column from which the remaining oxygen-enriched gas is transferred starts desorption simultaneously that is, regeneration, through the inlet thereof in the direction opposite to the inflow direction of the gas mixture for adsorption, because the nitrogen gas desorbed from the zeolite molecular sieve must be prevented from break through from the inlet to the outlet of the first adsorption column. In the remaining oxygen-enriched gas transfer from the first adsorption column to the second adsorption column, it is essential to discontinue the transfer before the nitrogen desorbed from the first adsorption column breaks through the second adsorption column. Usually, the transfer should be discontinued when the pressure difference between these two columns reaches 100 to 400 mm Hg, preferably 200 to 300 mm Hg. The oxygen-enriched gas transfer time for the recovery is preferably as short as possible, for example, about 5 sec. When the pressure difference between these two columns is smaller than 100 mm Hg, a large amount of the nitrogen desorbed from the molecular sieve in the first adsorption column is transferred to the second adsorption column together with the recovered remaining oxygen-enriched gas, and consequently the product oxygen-enriched gas will have an increased nitrogen content. As a result, the volume of oxygen in the oxygen-enriched gas is decreased, and the oxygen recovery rate is consequently lowered. On the other hand, when the pressure difference between these two columns is larger than 400 mm Hg, the quantity of the transferred remaining oxygen-enriched gas becomes smaller, and the oxygen recovery rate will be lowered. The oxygen recovery rate refers to a percentage by volume of pure oxygen volume in product gas to that in mixed gas. Even after the remaining gas transfer, that is, the recovery, the first adsorption column is still under continuous desorption, that is, regeneration, and the second adsorption column which has received the remaining oxygen-enriched gas from the first adsorption column is filled through the outlet thereof with the product oxygen-enriched gas until the pressure of the second adsorption column reaches substantially atmospheric pressure. The second adsorption column is made ready thereby for the successive adsorption. During these operations, a third adsorption column is under adsorption. Adsorption, desorption and filling are repeated in this manner one adsorption column after another successively, whereby an oxygen-enriched gas can be produced through pressure swing adsorption.

DETAILED DESCRIPTION OF THE INVENTION

Figure 1:
FIG. 1 shows an operational sequence according to the present process, based on a system shown in FIG. 2.
Figure 2:
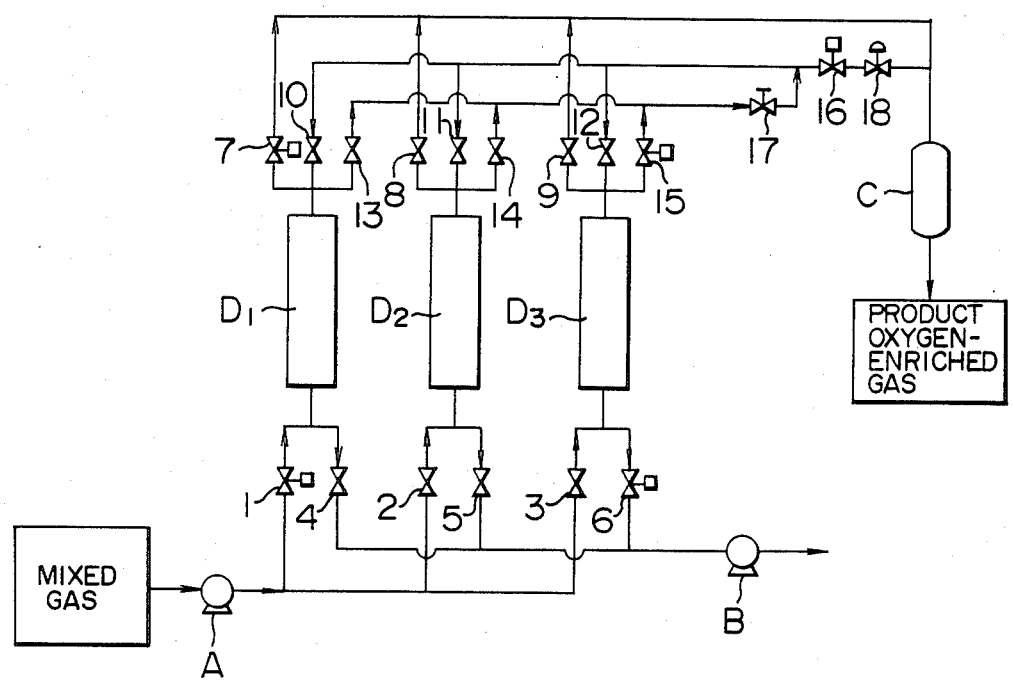
FIG. 2 is a schematic flow diagram of a system for conducting the present process.

Reference is now made to FIGS. 1 and 2 which illustrate an operational sequence of the present process and a system for conducting the present process, respectively.

In FIG. 1, each operation of adsorption, desorption and filling is conducted for 50 to 70 sec and one cycle of the adsorption, desorption and filling is finished within 150 to 210 sec. in three adsorption columns $D_1$, $D_2$ and $D_3$, each packed with zeolite molecular sieve. In FIG. 2, a gas mixture containing oxygen and nitrogen as main gas components is compressed to a pressure ranging from atmospheric pressure to 5,000 mm $H_2O$ by a blower A, and introduced into the first adsorption column $D_1$ through a valve 1. The nitrogen gas is adsorbed in the first adsorption column $D_1$ and removed from the gas mixture, and an oxygen-enriched product gas leaves the first adsorption column $D_1$ and is stored in a product tank C through a valve 7. The second adsorption column $D_2$ which has completed desorption receives the oxygen-enriched gas remaining in the upper part of the third adsorption column $D_3$ which has completed adsorption through valves 15 and 17 by opening only valve 11. The remaining gas transfer is discontinued when a pressure difference between the third adsorption column $D_3$ and the second adsorption column $D_2$ reaches 100 to 400 mm Hg. Usually, the gas transfer time is 3 to 7 sec. During the remaining gas transfer, valve 17 works as a restriction valve to prevent rapid transfer of the remaining gas while valve 16 is closed to prevent any back flow of the product oxygen-enriched gas from the product tank C. During the gas transfer, valve 6 is opened and the adsorbed nitrogen gas is desorbed from the third adsorption column $D_3$ and withdrawn from the third adsorption column $D_3$ by means of a vacuum pump B. In the third adsorption column $D_3$, the remaining oxygen-enriched gas is transferred from the outlet, whereas the desorbed nitrogen gas is withdrawn from the inlet in the direction opposite to the inflow direction of the gas mixture for adsorption. The second adsorption column $D_2$ which has received the remaining oxygen-enriched gas from the third adsorption column $D_3$ for 3 to 7 sec before receiving a product oxygen-enriched gas from the product tank C through a valve 18 at a constant flow rate until the product oxygen-enriched gas is filled therein so as to finally obtain the adsorption pressure. The second adsorption column $D_2$ is made ready at that time for successive adsorption. In this way, the first step is complete. Successively, the second step is completed by using valve 2 in place of valve 1 in the first step, valve 4 in place of valve 6, valve 8 in place of valve 7, valve 12 in place of valve 11, and valve 13 in place of valve 15. Likewise, the third step is completed by using valve 3 in place of valve 1 in the first step, valve 5 in place of valve 6, valve 9 in place of valve 7, valve 10 in place of valve 11, and valve 14 in place of valve 15. Thus, the same operations are repeated one adsorption column after another successively to form one cycle of the first to the third steps for 150 to 210 sec.

The valve 17 is manually used for restriction of gas flow rate at the recovery, and the valve 18 is used for automatically controlling the filling gas flow rate at the filling.

EXAMPLE

In an apparatus shown in FIG. 2 with the operational sequence shown in FIG. 1, tests for producing an oxygen-enriched gas from air were conducted for a 180 sec/cycle. Three adsorption columns $D_1$, $D_2$, and $D_3$, each 65 mm in diameter and 600 mm in height and packed with 5 Å zeolite molecular sieve manufactured by Bayer AG., West Germany, were used. The outlet of third adsorption column $D_3$ which had completed by supplying air adsorption for 60 sec under a pressure of 500 mm $H_2O$ was connected for 5 sec with the outlet of the second adsorption column $D_2$ which had completed desorption under the final pressure of 150 mm Hg abs., using a vacuum pump B for 60 sec to recover the oxygen-enriched gas remaining in the column $D_3$.

When the oxygen-enriched gas recovery was conducted until a pressure difference between the two columns $D_2$ and $D_3$ became substantially 0 after 5 sec, that is, without any restriction to the quantity of remaining oxygen-enriched gas to be transferred, the pressures in the two columns $D_2$ and $D_3$ became substantially equally 410 mm Hg and an oxygen-enriched gas having an oxygen concentration of 93% by volume was obtained. The product oxygen-enriched gas was obtained at 33 Nl/hr and at 41% of an oxygen recovery rate and 358 Nl/hr of air flow rate.

On the other hand, when the oxygen recovery was conducted with restriction on the quantity of the remaining oxygen-enriched gas to be transferred so that the column $D_3$ which had completed adsorption had a pressure of 310 mm Hg and the column $D_2$ which had completed desorption had a pressure of 480 mm Hg, and the pressure difference between these columns became 170 mm Hg, 46.5 Nl/hr of product oxygen-enriched gas having the same oxygen concentration of 93% by volume was obtained at 47% of an oxygen recovery rate and 440 Nl/hr of air inflow rate.

From the above test, it can be seen that by providing an appropriate pressure difference between the two connected adsorption columns in the remaining oxygen-enriched gas transfer, even though the same amount of the zeolite is packed, a product oxygen-enriched gas having the same oxygen concentration of 93% by volume can be obtained at 47% of oxygen recovery rate higher than 41% by 6%. Accordingly, the present invention can provide an oxygen-enriched gas with industrial advantages of a high oxygen recovery rate. For example, an oxygen-enriched gas containing 93% by volume of oxygen can be obtained from air at a high oxygen recovery rate of 47%.

While a particular embodiment of the invention has been shown, it should be understood that the invention is not limited thereto, since modifications may be made, and it is contemplated to cover by the appended claims any such modifications as fall within the spirit and scope of the invention.

What is claimed is:

1. A process for producing an oxygen-enriched gas from a gas mixture containing oxygen and nitrogen as main gas components by pressure swing adsorption, using a set of three adsorption columns, each packed with a zeolite molecular sieve as an adsorbent through a cyclic operation of adsorption under a pressure of from atmospheric pressure to 5,000 mm $H_2O$ and desorption under a vacuum pressure down to a final pressure of 150 mm Hg abs., which comprises passing the gas mixture through a first adsorption column, thereby conducting adsorption of substantially other gas components except the oxygen gas, while bringing a third adsorption column which has completed adsorption into a vacuum pressure through the inlet thereof, thereby conducting desorption of the adsorbed gas components in the third adsorption column and withdrawing the resulting desorbed gas components through the inlet thereof in the direction opposite to the inflow direction of the gas mixture for adsorption, while connecting the outlet of the third adsorption column to the outlet of a second adsorption column which has completed desorption at the same time as the initial stage of the desorption of the third adsorption column, thereby transferring the oxygen-enriched gas remaining in the third adsorption column therefrom to the second adsorption column, thereby recovering the remaining oxygen-enriched gas from the third adsorption column; discontinuing the remaining gas transfer before the pressure of the third adsorption column becomes equal to that of the second adsorption column, while continuing the desorption of the third adsorption column through the inlet thereof; initiating filling of a part of the product oxygen-enriched gas into the second adsorption column through the outlet thereof at the discontinuation of the remaining gas transfer, and repeating the foregoing cyclic operations one adsorption column to another successively.

2. A process according to claim 1, wherein the remaining oxygen-enriched gas transfer is discontinued when a pressure difference between the third adsorption column and the second adsorption column reaches 100 mm Hg to 400 mm Hg.

3. A process according to claim 1, wherein the gas mixture is air.

4. A process according to claim 1, wherein the zeolite molecular sieve has an average micro-pore size of 5 Å.

* * * * *